No. 876,548. PATENTED JAN. 14, 1908.
L. E. HICKOK.
KING BOLT CONNECTION FOR VEHICLES.
APPLICATION FILED MAY 27, 1907.
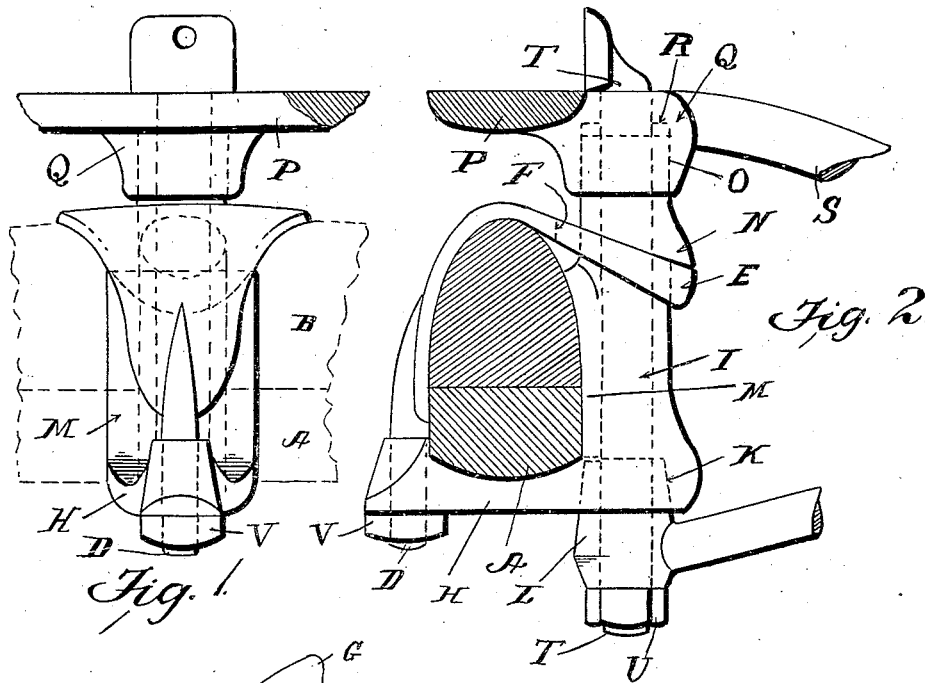
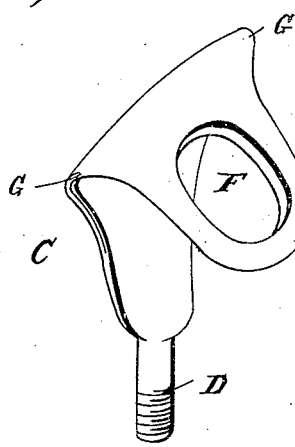
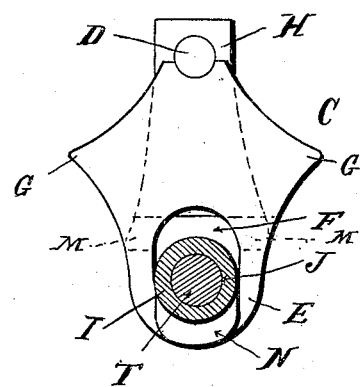
Witnesses
Chas. T. Davis
Ralph Wormelle
Inventor
L. E. Hickok,
By F. E. Stebbins,
Attorney

UNITED STATES PATENT OFFICE.

LESTER E. HICKOK, OF BROOKLYN, NEW YORK, ASSIGNOR OF ONE-HALF TO THE CLEVELAND HARDWARE COMPANY, OF CLEVELAND, OHIO.

KING-BOLT CONNECTION FOR VEHICLES.

No. 876,548.  Specification of Letters Patent.  Patented Jan. 14, 1908.

Application filed May 27, 1907. Serial No. 375,892.

*To all whom it may concern:*

Be it known that I, LESTER E. HICKOK, a citizen of the United States, residing at Brooklyn, in the county of Kings and State of New York, have invented new and useful Improvements in King-Bolt Connections for Vehicles, of which the following is a specification.

The object of my invention is the provision of improved means for uniting the axle of a vehicle to the head block and head block plate so the former may turn relative to the latter, said means to be of very simple construction, cheap in first cost, and adapted to be firmly secured to the axle and axle bed.

With this end in view my invention consists in certain novelties of construction and combinations of parts as hereinafter set forth and claimed.

The drawing illustrates an example of the physical embodiment of the invention constructed according to the best mode I have so far devised for the practical application of the principle.

Figure 1 is a front view in elevation of the means employed, the axle and bed being shown in dotted lines. Fig. 2 is an end view of Fig. 1 with the axle and bed in full lines. Fig. 3 is a view in perspective of the clip. Fig. 4 is a top plan view of Fig. 2 with the head block plate and king bolt removed.

Referring to the several figures, the letter A designates the axle; B, the axle bed; C, the clip; D, the threaded bolt end of the clip; E, the extension of the clip disposed at an angle to the bolt end thereof; F, an elongated hole or slot in the extension forming an eye; G, flanges; H, the yoke perforated at the end; I, the post integral with the yoke; J, a longitudinal hole through the post; K, a tapering recess to receive the brace head; L, the perforated tapering brace head; M, M, two flanges to engage the rear surface of the axle and bed; N, a flange or enlargement near the rear top end of the post; O, the cylindrical top end of the post; P, the head block plate; Q, a perforated lug at the rear of the plate; R, a seat for the top end of the post; S, a perch iron; T, the king bolt passed through the lug of the head block plate, the post, and the brace head; U, a nut on the king bolt; and V is a nut on the end of the clip.

The relative locations of the several parts when assembled are clearly shown by the drawing. In applying the clip and yoke and post to the axle and bed the elongated slot or eye in the clip is passed over the top end of the post to a position below the flange N on the post. The nut V on the bolt end when turned draws the clip and yoke and post together and causes them to firmly grip the axle and axle bed.

What I claim is:

1. A king bolt connection for vehicles, comprising an axle and bed; an integral yoke and perforated post; a clip with a threaded bolt end and nut, and also a slot within which the upper end of the post is located; a head block plate with a perforated lug; a perforated brace head; and a king bolt and nut.

2. The combination with an axle, of an integral axle yoke and post, said axle yoke being perforated at the end and the post longitudinally perforated; a clip having a threaded bolt end and an eye or slot adapted to pass over the upper end of the post; and a nut for the threaded bolt end.

3. An integral yoke and post, said yoke being perforated at the end and located at right angles to the post, and said post longitudinally perforated and provided with an enlargement or flange near the free end.

4. An integral yoke and post, said yoke being perforated at the free end, and said post longitudinally perforated and provided with a flange or enlargement N and flanges M, M, as and for the purpose set forth.

5. The combination with a yoke and a post having a flange or enlargement N, of a clip with a threaded bolt end and an elongated hole or slot of larger dimensions than the free end of the post.

In testimony whereof I affix my signature in presence of two witnesses.

LESTER E. HICKOK.

Witnesses:
 RALPH WORMELLE,
 F. E. STEBBINS.